No. 898,337. PATENTED SEPT. 8, 1908.
J. W. DENMEAD.
BOX FILLING MACHINE.
APPLICATION FILED JAN. 15, 1904. RENEWED FEB. 15, 1908.
5 SHEETS—SHEET 1.
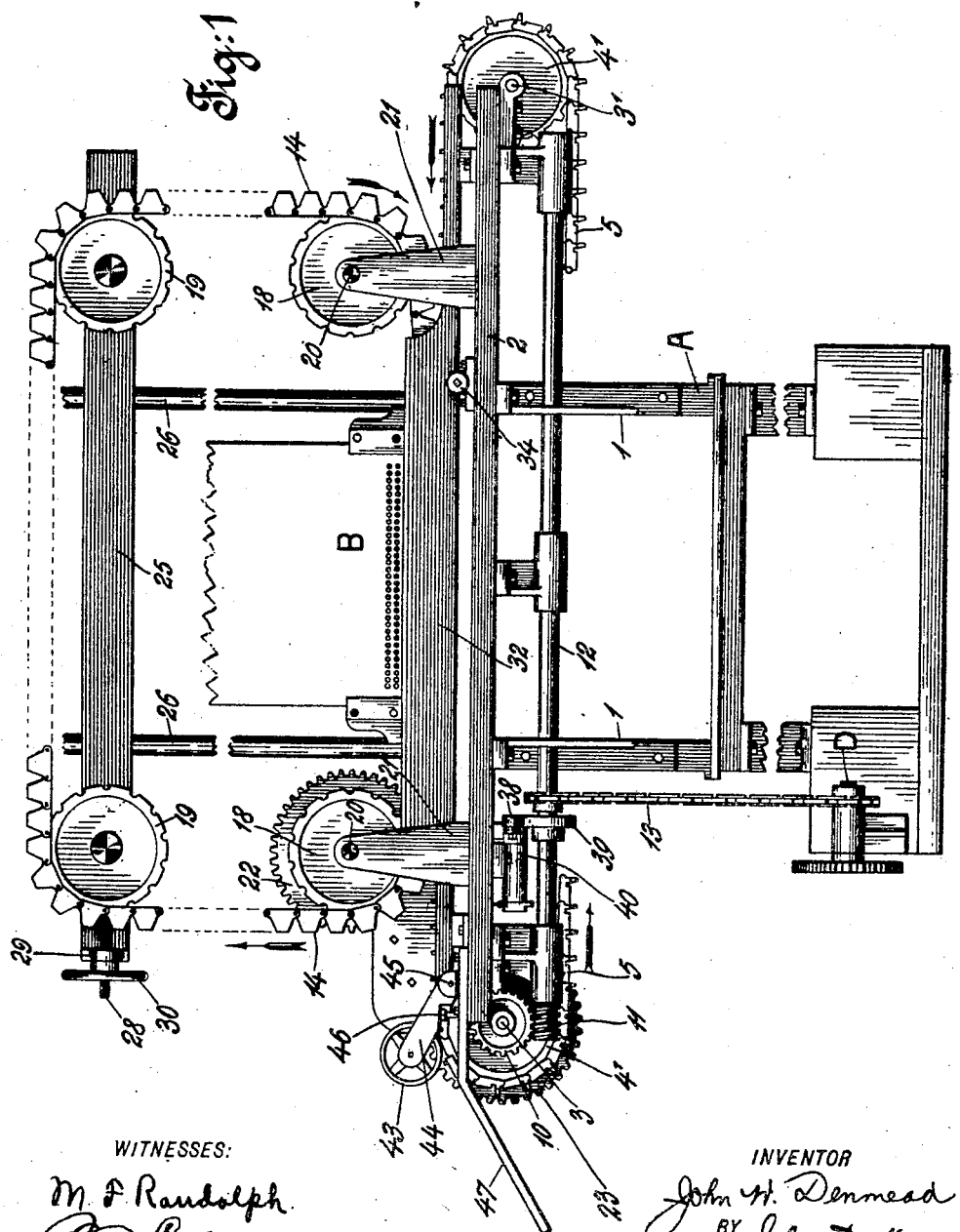
WITNESSES:
M. F. Randolph
R. Lopez
INVENTOR
John W. Denmead
BY
John R. Nolan
ATTORNEY No. 898,337. PATENTED SEPT. 8, 1908.
J. W. DENMEAD.
BOX FILLING MACHINE.
APPLICATION FILED JAN. 15, 1904. RENEWED FEB. 15, 1908.
5 SHEETS—SHEET 2.
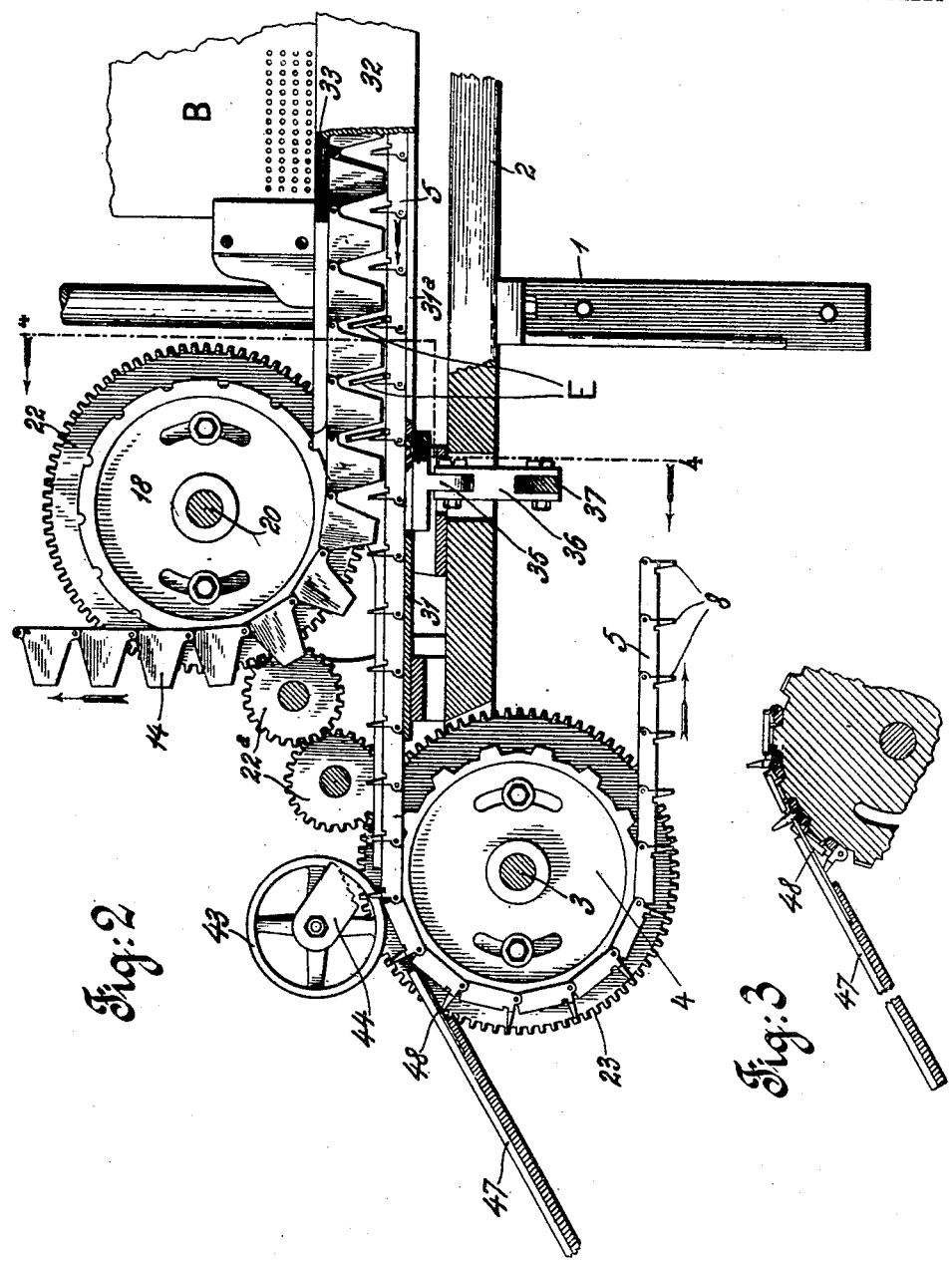
WITNESSES:
M. F. Randolph
A. Lopez
INVENTOR
John H. Denmead
BY
John F. Nolan
ATTORNEY

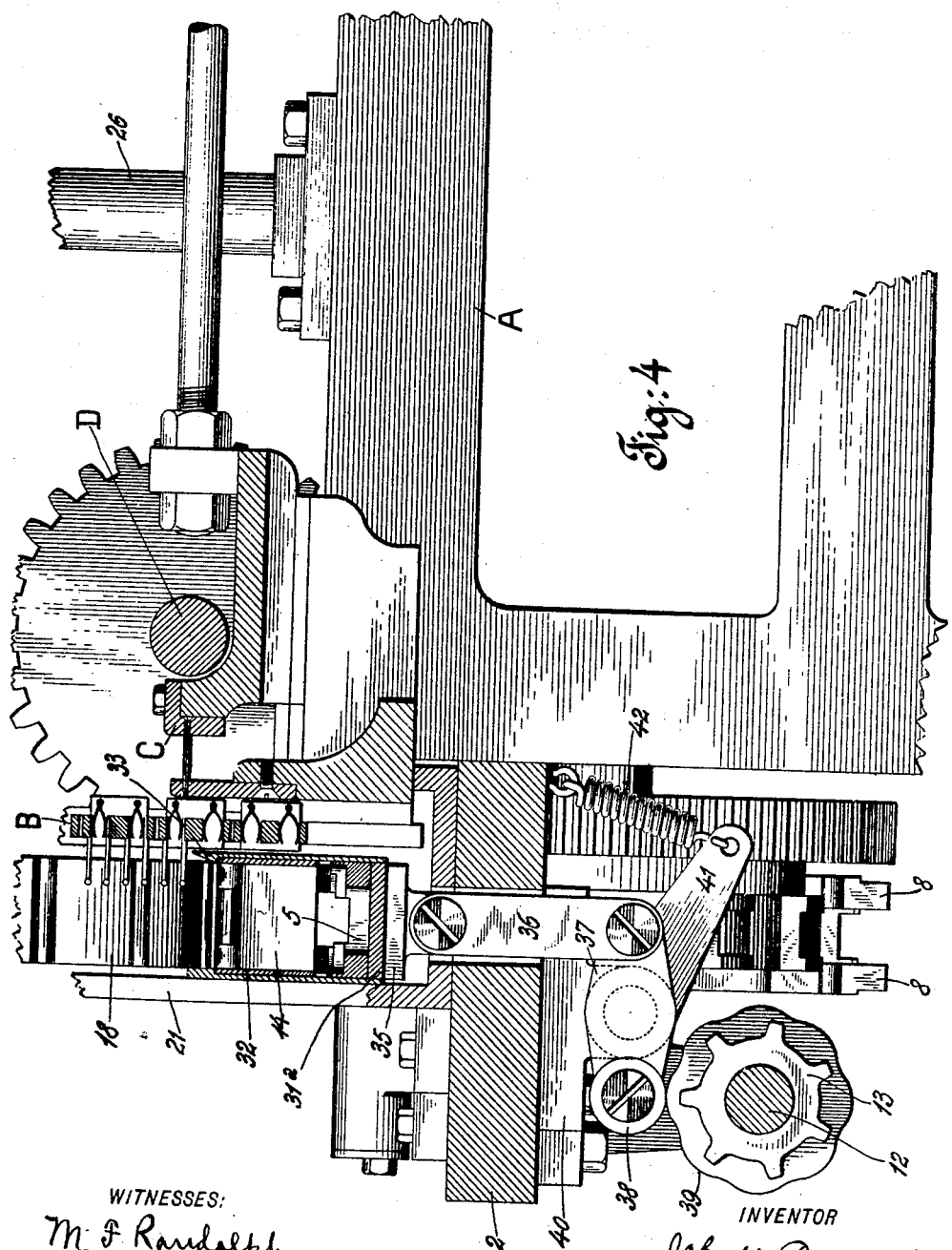

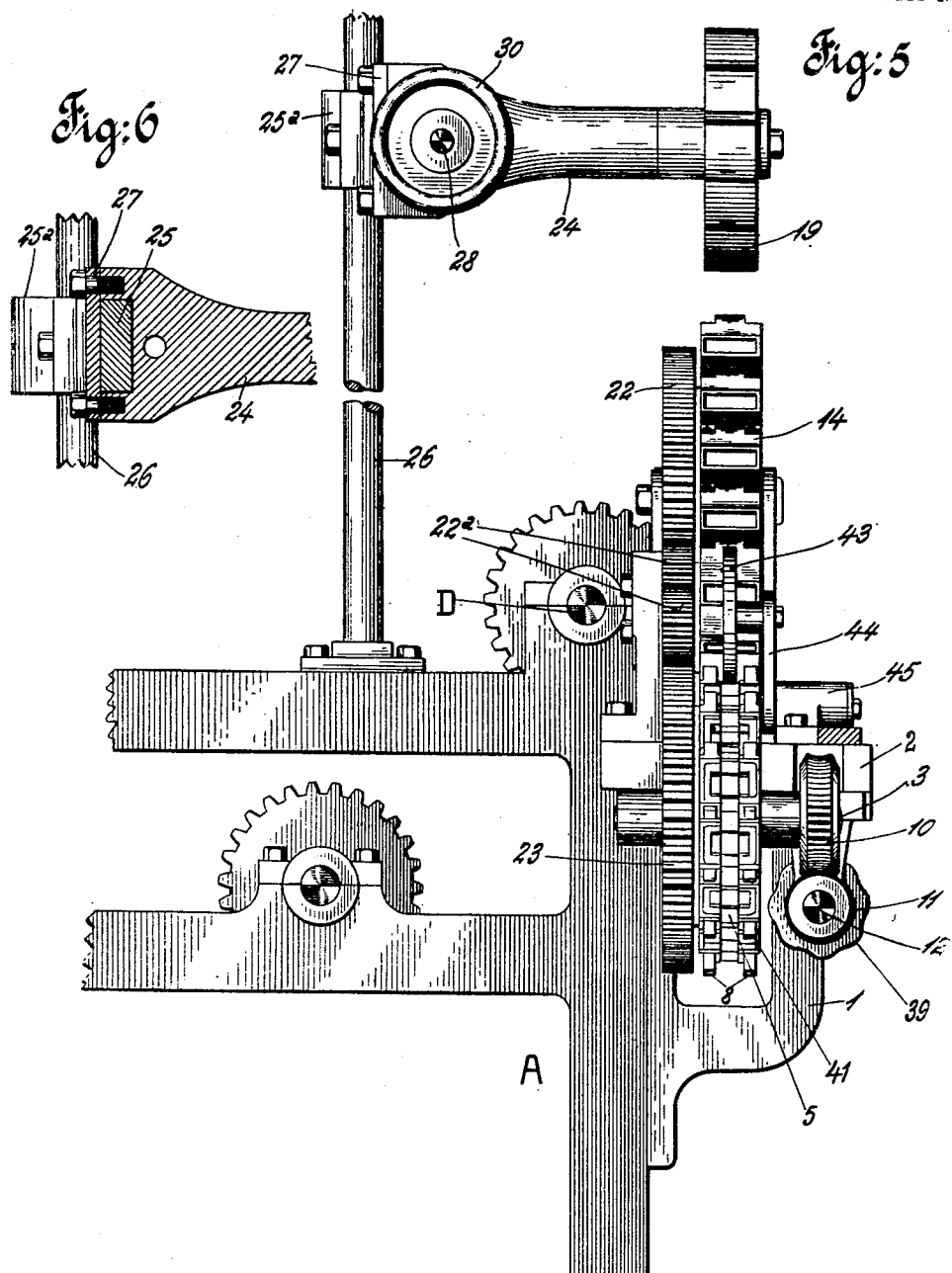

No. 898,337. PATENTED SEPT. 8, 1908.
J. W. DENMEAD.
BOX FILLING MACHINE.
APPLICATION FILED JAN. 15, 1904. RENEWED FEB. 15, 1908.
6 SHEETS—SHEET 5.
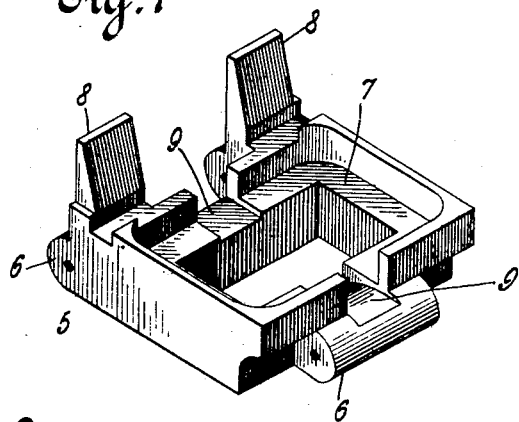
Fig: 7
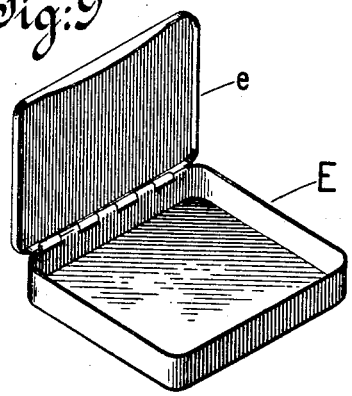
Fig: 9
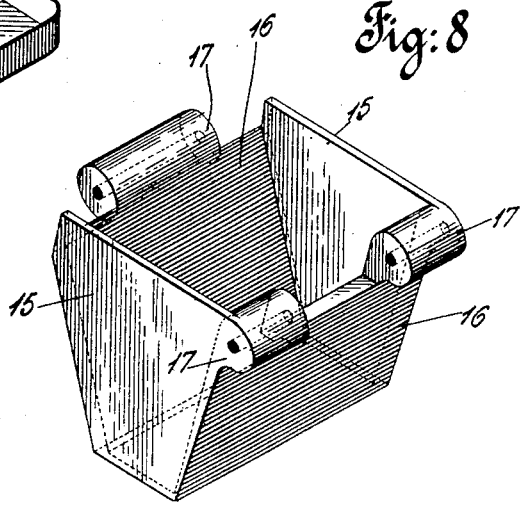
Fig: 8
WITNESSES:
M. F. Randolph
R. A. Lopez
INVENTOR
John W. Denmead
BY
John R. Nolen
ATTORNEY

UNITED STATES PATENT OFFICE.

JOHN WILLIAM DENMEAD, OF AKRON, OHIO, ASSIGNOR TO THE DIAMOND MATCH COMPANY, OF NEW YORK, N. Y., A CORPORATION OF ILLINOIS.

BOX-FILLING MACHINE.

No. 898,337.   Specification of Letters Patent.   Patented Sept. 8, 1908.

Application filed January 15, 1904, Serial No. 189,109. Renewed February 15, 1908. Serial No. 416,106.

*To all whom it may concern:*

Be it known that I, JOHN WILLIAM DENMEAD, a citizen of the United States, and resident of Akron, in the county of Summit and State of Ohio, have invented certain new and useful Improvements in Box - Filling Machines, of which the following is a specification.

This invention relates to machines for filling boxes with matches, tooth-picks, or the like; having reference, more especially, to novel mechanism for automatically filling boxes with wax matches, or "vestas" as the latter are discharged from a match making machine.

In the present embodiment of my invention two endless carriers are mounted to travel in close relation to each other and to the discharging portion of a match machine, one carrier, termed a "box carrier" being constructed and arranged to receive and transport the boxes to be filled and the other carrier, termed a "feed carrier", being provided with hopper-like members into which the matches from the machine are discharged and thereby progressively delivered into the train of boxes; the box carrier being designed to support the lids of the boxes in open position while the boxes are being filled, and provisions being had whereby the lids of the filled boxes are successively closed preparatory to the discharge of the latter from the machine.

The particular construction and organization of mechanism which I have selected to illustrate my invention will be hereinafter fully described, and the scope of the invention will be pointed out in the appended claims.

In the drawings—Figure 1 is a side elevation of my improved box filling and closing machine; Fig. 2 is a longitudinal vertical section, enlarged, of the delivery end of the machine; Fig. 3 is a sectional detail of the stripper and its adjuncts at such end; Fig. 4 is a partial transverse vertical section, enlarged, as on the line 4—4 of Fig. 2; Fig. 5 is a partial end view of the discharging end of the machine, with the chute omitted. Fig. 6 is a sectional detail of an adjustable bracket-arm mounting; Fig. 7 is a perspective view of one of the links of the box carrier; Fig. 8 is a similar view of one of the links of the feed carrier; Fig. 9 is a like view of a box such as my machine is designed to fill and close.

A designates a portion of the main frame of a match making machine; B a portion of the match carrier; C a reciprocating punch head for ejecting the matches row by row from the carrier, and D a power driven shaft of the machine. These parts are of any usual or approved construction, and, therefore, they need no detailed description herein.

On the end of the machine frame are brackets 1 upon which a bed 2 is supported in a horizontal plane below the path of discharge of the matches from the match carrier. Mounted in suitable bearings at the respective ends of the bed are shafts 3, 3' carrying sprocket wheels 4', around which passes an endless chain 5, the links whereof are constructed and arranged to receive and carry the boxes to be filled. One of these links is most clearly shown in Fig. 7. As will be observed, it comprises an open rectangular body provided on its ends with perforated lugs 6 for the passage of pivot pins that flexibly connect the adjoining links. The upper, inner edges of the body are recessed or cut away to afford a seat or receptacle, 7, for the body of the box (E) and the forward or leading end of the link is provided with upwardly projecting lugs 8, which are adapted to support the open hinged lid (e) of the box. The upper edges of the front and back walls of the linked body are recessed or cut away, as at 9, in line with the space between the lugs to permit the action against the under side of the box of a stripper, which will be presently described. The chain 5 thus constitutes a box carrier. It is continuously driven in the direction indicated, so that the boxes therein are passed progressively across the path of the matches discharged from the match machine. The driving means for the carrier comprises preferably a worm-wheel 10 on the shaft 3, in gear with a worm 11 on a horizontal shaft 12 mounted in suitable bearings below the bed, the latter shaft being conveniently driven from the main shaft by appropriate sprocket gearing 13.

To insure the uniform feeding and delivery of the matches to the traveling train of boxes, an endless feed carrier 14 moving directly above and in concert with the box carrier is provided. This carrier 14 includes a chain of hopper-like links, one of which is most clearly shown in Fig. 8. Each link, in its preferred construction, comprises two parallel side walls 15, and two end walls 16 which taper inwardly from the top to the bottom, thus affording a hopper-like member open at its top and bottom. The end walls of the link are provided at their upper edges with perforated lugs 17 for the reception of the pivot pins that flexibly connect the adjoining links of the carrier. These links correspond in number and position with the adjacent links of the box carrier during the concerted travel of the two carriers, to the end that the matches discharged from the match machine will fall into the respective under-lying hopper members and be thereby progressively delivered in a uniform and orderly manner to the traveling train of boxes below the same.

The feed carrier passes around a series of suitably located sprocket wheels 18,—19. In the present instance there are four wheels arranged in upper and lower pairs, so as to cause the carrier to assume and maintain the position indicated in Fig. 1, and thereby travel in a path directly above and in parallelism with the train of boxes in the box carrier, for the purpose stated.

The wheels 18, are mounted upon shafts 20 having their bearings in posts 21 rising from the bed 2. One of these wheels constitutes the driving factor for the feed carrier, and therefore the shaft of such wheel bears a gear wheel 22, which coacts, through interposed gears 22$^a$, with a spur wheel 23 on the driven shaft 3 above referred to, the gearing being relatively proportioned, of course, to insure the timely travel of the two carriers.

The upper wheels 19 are mounted on studs on the outer ends of horizontal brackets 24, extending from a suitably arranged supporting bar 25, which is secured by clamps 25$^a$ to vertical posts 26, so as to be vertically adjustable on the latter. One of these brackets is longitudinally adjustable in respect to the bar, to permit the regulation of the tension of the feed carrier, as need may require. To this end, the bracket is provided with lugs which embrace the upper and lower edges of the bar and are connected by a cap plate 27. A screw 28 extends from the bracket through a perforated lug 29, on the adjacent end of the bar 25, and an adjusting hand nut 30 is applied to the outer portion of the screw. Hence, by properly manipulating the nut the requisite adjustment of the bracket and its appurtenances may be effected.

As a simple and efficient means to insure the effective settling of the matches within the boxes, I arrange directly above the bed, and parallel therewith, a trough through which the adjacent traveling portions of the two carriers extend. This trough embodies a bottom 31 and two sides 32, the latter being reduced, as shown, at their respective ends. The higher, intermediate portions of these sides are provided along their upper, inner edges with ledges 33 which afford guides for the upper edges of the hopper-like links during their travel; the box carrier during its movement resting upon the bottom of the trough. Such bottom is composed in the main, of a vibratory section 31$^a$ which extends somewhat beyond the respective ends of the match carrier (B). One end of this section is pivotally supported on a bracket 34 which is located upon the bed at a point adjacent the entrance of the feed carrier to the trough. The opposite end of the section is provided with a depending bracket 35 which is connected by means of a link 36 with one end of a rock lever 37, the other or free end of which bears preferably, a roller 38, contacting with a peripherally fluted cam 39, on the worm shaft 12. The rock shaft for the lever has its bearings in a bracket 40 on the underside of the bed, and one end of the shaft is provided with an arm 41 which is connected with a retracting spring 42, depending from the bed. The tendency of this spring is to maintain the rock lever in yielding engagement with the cam, and hence, during the rotation of said cam, the bottom section of the trough is rapidly vibrated vertically with a corresponding action upon the flexibly connected links of the carrier, and perforce the boxes and their contents. The feed carrier, for a portion of its traverse, sags or rests upon the adjacent portion of the box carrier, and hence, during the vibration of the latter as above described, the contiguous portion of the feed carrier is similarly agitated to insure the free passage of the matches therethrough to the underlying boxes.

The empty boxes with their lids thrown open are applied by an attendant to the links of the box carrier at the end of the machine where the two carriers approach each other, that is, at the right-hand end of the machine as viewed in Fig. 1. The box lids stand up against the lugs 8, of the links 5, and during their travel occupy the spaces between the links of the feed carrier. When the filled boxes approach the discharging end of the box carrier they are acted upon by a lid closing device, which, in the present instance, comprises a freely revoluble wheel 43 carried on the upper or free end of an inclined arm 44 which is pivoted at its lower end to a bracket 45 on the bed. The said wheel is supported in the path of the spaces between the lid-supporting lugs of the box carrier so that the advancing box lids abut successively against the wheel and are closed thereby down upon the body of the box, the wheel, as each box progresses thereunder, riding upon the lid and insuring the complete closing thereof. An adjustable stop to limit the inclination of the pivoted arm 44, and perforce the position of the wheel 43, vertically in respect to the box, is provided, which stop preferably comprises a screw 46, rising from the bracket beneath the arm. Directly in advance of the wheel 43 is a downwardly inclined chute 47 upon which the closed boxes are successively delivered from the box carrier and thereby directed to a suitable point of discharge.

The stripper above alluded to comprises an inclined strip of metal 48 which being secured at its lower end to the upper portion of the chute bears at its upper or free end upon the recessed portions of the box carrier links as they turn down upon the adjacent sprocket wheel, thereby taking against the undersides of the advancing boxes and directing them to the chute.

While the foregoing is a description of an embodiment of my invention which actual practice has proved to be efficient and desirable, yet I wish it to be understood that the mechanism herein illustrated and described may be modified in various respects without departure from the fair spirit of the invention.

I claim—

1. In a box filler, the combination with means for supporting a series of boxes with their lids in open position, of a carrier provided with depending feed portions arranged to travel above said boxes and proportioned to afford between adjacent portions, spaces for the open lids, and means for actuating said carrier.

2. In a box filler, the combination with means for supporting a series of boxes, with their lids in open position of a carrier provided with hopper-like portions arranged to travel above said boxes, and to afford between adjacent portions spaces for the open lids and means for actuating said carrier.

3. In a box filler, the combination with means for impelling a train of boxes with their lids in open position, of a carrier provided with depending feed portions arranged above the path of said boxes and proportioned to afford between adjacent portions, spaces for the open lids, and means for moving said carrier in concert with the train of boxes.

4. In a box filler, the combination with a carrier, to receive and support a train of boxes with their lids in open position, of a carrier having hopper-like portions arranged above the path of the boxes in the former carrier, to afford between adjacent portions spaces for the open lids and means for moving said carriers in concert.

5. In a box filler, the combination with an endless carrier to receive and support a train of boxes with their lids in open position, of an endless carrier having hopper-like portions arranged to travel above the path of the boxes and to afford between adjacent portions spaces for the open lids in the former carrier, and means for continuously driving said carriers in concert.

6. In a box filler, the combination with a traveling carrier comprising flexibly connected links upon which open boxes are deposited, said links having means to receive and support a train of boxes with their lids in open position, of means for progressively feeding material to said boxes during their traverse and means for closing the lids of the filled boxes.

7. In a machine for filling boxes having hinged lids, the combination with a traveling carrier comprising flexibly connected links having means to receive and support boxes with their lids in open position, of means for successively closing the said lids.

8. In a box filler, the combination with means for impelling a train of boxes with open lids, of a train of hoppers arranged above the path of said boxes and proportioned to afford between adjacent portions, spaces for the open lids, means for moving said hoppers in concert with the boxes, and means for closing the lids of the boxes.

9. In a box filler, the combination with means for impelling a train of boxes with open lids, of a closing wheel arranged in the path of travel of the said lids so as to close the said lids in succession and bear rotatably upon the tops of the same during their traverse.

10. In a box filler, the combination with means for impelling a train of boxes with open lids, of a closing wheel arranged in the path of travel of the said lids, so as to close the said lids in succession and bear rotatably upon the tops of the same during their traverse and means for adjusting the position of said wheel in respect to said path.

11. In a box filler, the combination with means for impelling a train of boxes with open lids, of a pivoted arm, and lid-closing means thereon arranged in the path of travel of the said lid.

12. In a box filler, the combination with means for impelling a train of boxes with open lids, of a pivoted arm, lid-closing means thereon, and an adjustable stop for said arm.

13. In a box filler, the combination with means for impelling a train of boxes with open lids, of an inclined pivoted arm and a lid-closing wheel thereon in the path of travel of said lids.

14. In a box filler, the combination with means for impelling a train of boxes with open lids, of an inclined pivoted arm, a lid-closing wheel thereon in the path of travel of said lids, and an adjustable stop for said arm.

15. In a box filler, a traveling carrier comprising links provided with recesses or receptacles therein for boxes, and with upward projections to sustain the open box lids.

16. In a box filler, the combination with a lid-closer, of a traveling carrier having links each of which is provided with a recess for a box, and with a lug or projection to sustain the box lid in open position.

17. In a box filler, the combination with a traveling carrier made up of integral links each of which includes an open rectangular body whereof the inner edges are recessed to afford a seat for a box, the front and back walls of said body having alining recesses intersecting said seat, of a stripper adapted to extend into said latter recesses of the links during a portion of their traverse.

18. In a box filler, the combination with a traveling carrier made up of integral links each of which includes an open rectangular body whereof the inner edges are recessed to afford a seat for a box, the front and back walls of said body having alining recesses intersecting said seat, of a stripper adapted to extend into said latter recesses of the links during a portion of their traverse, and a chute to which said stripper leads.

19. In a box filler, the combination with a traveling box carrier, of a support therefor upon which said carrier bears, said support being pivoted at one end so as to be capable of vertical vibration, and means for vertically vibrating said support, with a flexible feed carrier, said feed carrier for a portion of its length resting or sagging upon the box carrier.

20. In a box filler the combination with a box carrier to receive and support a train of boxes, and a flexible feed carrier provided with feed portions to travel above the said boxes, the said feed carrier for a portion of its length resting or sagging upon the box carrier of a trough through which the adjacent portions of said carriers travel, the bottom of said trough being provided with a movable section upon which the box carrier rests, and the side or sides of the trough being provided with a guide or guides for the feed carrier, together with means for agitating said movable section.

21. In a box filler, the combination with a flexible box carrier to receive and support a train of boxes, and a feed carrier provided with feed portions to travel above the said boxes, the said latter carrier for a portion of its length sagging upon the box carrier, of means for vertically agitating said box carrier.

Signed at Akron in the county of Summit and State of Ohio this 14 day of December A. D. 1903.

JOHN WILLIAM DENMEAD.

Witnesses:
B. C. Ross,
F. M. Root.